United States Patent
Yu et al.

(10) Patent No.: US 11,388,026 B2
(45) Date of Patent: Jul. 12, 2022

(54) METHOD AND APPARATUS FOR SOUNDING REFERENCE SIGNAL TRANSMISSION ON SIDELINK

(71) Applicant: Lenovo (Beijing) Limited, Beijing (CN)

(72) Inventors: Xiaodong Yu, Beijing (CN); Haipeng Lei, Beijing (CN); Zhi Yan, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 16/647,244

(22) PCT Filed: Sep. 28, 2017

(86) PCT No.: PCT/CN2017/104031
§ 371 (c)(1),
(2) Date: Mar. 13, 2020

(87) PCT Pub. No.: WO2019/061167
PCT Pub. Date: Apr. 4, 2019

(65) Prior Publication Data
US 2020/0267025 A1    Aug. 20, 2020

(51) Int. Cl.
*H04L 25/22* (2006.01)
*H04L 25/02* (2006.01)
(Continued)

(52) U.S. Cl.
CPC ........ *H04L 25/0226* (2013.01); *H04L 1/1614* (2013.01); *H04L 5/0051* (2013.01);
(Continued)

(58) Field of Classification Search
CPC . H04L 25/0226; H04L 1/1614; H04L 5/0051; H04L 5/0053; H04L 5/0094;
(Continued)

(56) References Cited

U.S. PATENT DOCUMENTS

2013/0083683 A1* 4/2013 Hwang ................ H04L 5/0053
370/252
2017/0149484 A1* 5/2017 Nimbalker ............ H04L 5/0048
(Continued)

FOREIGN PATENT DOCUMENTS

WO    2017026070 A1    2/2017
WO    2017107011 A1    6/2017

OTHER PUBLICATIONS

PCT/CN2017/104031, "International Search Report and the Written Opinion of the International Searching Authority/CN", PCT International Searching Authority/CN, State Intellectual Property Office of the P.R. China, dated Jun. 8, 2018, pp. 1-7.

*Primary Examiner* — Jackie Zuniga Abad
(74) *Attorney, Agent, or Firm* — Kunzler Bean & Adamson

(57) ABSTRACT

Methods and apparatus for SL SRS transmission are disclosed. One method of a relay/remote UE comprises transmitting a SRS on a SL. The SRS is based on a SL SRS configuration which configures location information of the SRS in time-frequency domain. The transmission of SRS can be either periodic or aperiodic. Further, the SRS is a single SRS or a set of SRS.

26 Claims, 8 Drawing Sheets

(51) Int. Cl.
*H04L 1/16* (2006.01)
*H04L 5/00* (2006.01)
*H04W 8/00* (2009.01)
*H04W 80/08* (2009.01)
*H04W 92/18* (2009.01)

(52) U.S. Cl.
CPC ........... *H04W 8/005* (2013.01); *H04W 80/08* (2013.01); *H04W 92/18* (2013.01)

(58) Field of Classification Search
CPC ..... H04W 8/005; H04W 80/08; H04W 92/18; H04W 88/04
See application file for complete search history.

(56) References Cited

U.S. PATENT DOCUMENTS

| | | | |
|---|---|---|---|
| 2017/0230972 A1* | 8/2017 | Wang | H04L 25/0224 |
| 2017/0353819 A1* | 12/2017 | Yin | H04L 47/30 |
| 2018/0035437 A1* | 2/2018 | Kahtava | H04W 72/085 |
| 2018/0098299 A1* | 4/2018 | Chae | H04W 76/14 |
| 2018/0323916 A1* | 11/2018 | Yang | H04L 5/0053 |
| 2018/0324848 A1* | 11/2018 | Baghel | H04W 76/11 |
| 2018/0367346 A1* | 12/2018 | Chen | H04B 17/345 |

\* cited by examiner

METHOD AND APPARATUS FOR SOUNDING REFERENCE SIGNAL TRANSMISSION ON SIDELINK

FIELD

The subject matter disclosed herein relates generally to wireless communication and more particularly relates to sidelink (SL) channel measurement in Device-To-Device (D2D) communication.

BACKGROUND

The following abbreviations and acronyms are herewith defined, at least some of which are referred to in the following description.

Third Generation Partnership Project ("3GPP"), Positive-Acknowledgment ("ACK"), Channel State Information ("CSI"), Control Channel ("CCH"), Device-to-Device ("D2D"), further enhancement Device-to-Device ("feD2D"), Downlink Control Information ("DCI"), Downlink ("DL"), Demodulation Reference Signal ("DMRS"), Evolved Node B ("eNB"), European Telecommunications Standards Institute ("ETSI"), Frequency Division Duplex ("FDD"), Frequency-Division Multiplexing ("FDM"), Frequency Division Multiple Access ("FDMA"), Long Term Evolution ("LTE"), LTE Advanced ("LTE-A"), Multiple Access ("MA"), Machine Type Communication ("MTC"), Narrowband ("NB"), Negative-Acknowledgment ("NACK") or ("NAK"), Orthogonal Frequency Division Multiplexing ("OFDM"), Physical Downlink Control Channel ("PDCCH"), Physical Downlink Shared Channel ("PDSCH"), Physical Sidelink Control Channel ("PSCCH"), Physical Sidelink Shared Channel ("PSSCH"), Physical Uplink Control Channel ("PUCCH"), Physical Uplink Shared Channel ("PUSCH"), Quality of Service ("QoS"), Radio Network Temporary ("RNTI"), Identity Radio Resource Control ("RRC"), Reference Signal Receiving Power ("RSRP"), Reference Signal Strength Indicator ("RSSI"), Receive ("RX"), Scheduling Assignment ("SA"), Scheduling Request ("SR"), Shared Channel ("SCH"), Sidelink Control Information ("SCI"), System Information Block ("SIB"), Sidelink ("SL"), Semi-Persistent Scheduling ("SPS"), Sounding Reference Signal ("SRS"), Transport Block ("TB"), Transport Block Size ("TBS"), Transmission Control Protocol ("TCP"), Time Division Duplex ("TDD"), Time-Division Multiplexing ("TDM"), Transmission Time Interval ("TTI"), Transmit ("TX"), Uplink Control Information ("UCI"), User Datagram Protocol ("UDP"), User Entity/Equipment (Mobile Terminal) ("UE"), Uplink ("UL"), Universal Mobile Telecommunications System ("UMTS"), Vehicle-to-Vehicle ("V2V") and Vehicle-to-Everything ("V2X"). As used herein, SL communication is also known as D2D communication.

In mobile communication networks, a remote UE may operate in an indirect communication mode where the remote UE accesses mobile network communication services via a relay UE. Both D2D and V2V communication are broadcast-based communication. However, broadcast-based communication does not meet the requirements for QoS, reliability, complexity and power consumption. Therefore, a new study on feD2D has been developed, that proposes to support unicast communication on sidelink.

BRIEF SUMMARY

Both 3GPP Rel-12/Rel-13 D2D communication and 3GPP Rel-14 V2V communication are typical broadcast-based communications, wherein one of the main objectives is to enable as many receivers as possible to successfully decode the messages. Mechanisms such as blind (re)transmission without feedback are no longer suitable for unicast communication. Enhancements to SL should be studied to support unicast communication in order to meet the requirements for QoS, reliability, complexity and power consumption, and furthermore, to enable D2D-aided wearables and MTC applications.

Enhancements to enable reliable unicast SL communication require effective channel measurement for feD2D communication between a relay UE and a remote UE. But if the SL channel measurement is based on scheduled SL transmission (e.g., discovery, synchronization signal, SCI over PSCCH or data over PSSCH) or the DMRS within the SL transmission (e.g., DMRS occupies the resource of PSCCH/PSSCH), it is difficult to obtain an effective result to present a thorough overview for the SL channel. This impacts resource pool/resource selection for SL communication and reliable unicast PC5 link and decreases the performance of link adaptation in SL communication. There is thus a need to develop a new measurement and report/feedback mechanism in which link adaption SL transmission based on the result of SL channel measurement is supported at a relay/remote UE.

In feD2D, it might be beneficial for a relay/remote UE to perform SL communication using uplink resources of the relay UE. For this, the last symbol of each SL subframe is not necessary to be a guard gap so that it can be used as a SL SRS for SL channel measurement.

Additionally, the SL SRS can be used for other purposes, such as power control for relay/remote UEs, similar with UL SRS.

Methods and apparatus for SRS transmission on SL are disclosed. One method of a relay/remote UE comprises transmitting a SRS on a SL. The SRS is based on a SL SRS configuration which configures the location information of the SRS in time-frequency domain. The transmission of SRS can be either periodic or aperiodic. Further, the SRS is a single SRS or a set of SRS.

One method of a relay/remote UE comprises receiving a SRS on a SL. The SRS is based on a SL SRS configuration which configures location information of the SRS in time-frequency domain. Further, the SRS is a single SRS or a set of SRS.

BRIEF DESCRIPTION OF THE DRAWINGS

A more particular description of the embodiments briefly described above will be rendered by reference to specific embodiments that are illustrated in the appended drawings. Given that these drawings depict only some embodiments and are not therefore to be considered to limit scope, the embodiments will be described and explained with additional specificity and detail through the use of the accompanying drawings, in which.

DETAILED DESCRIPTION

Figure 1A:
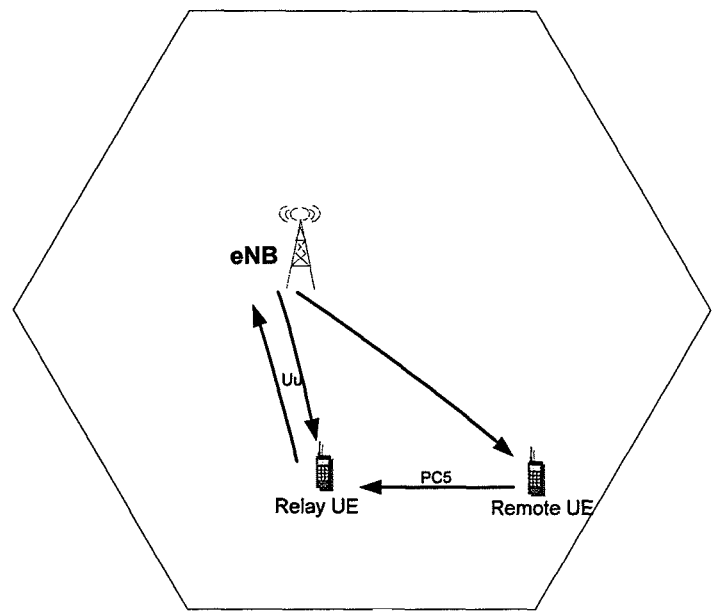
FIGS. 1A and 1B are schematic diagrams illustrating a unidirectional relay case and bidirectional relay case in unicast D2D communication, respectively.

As will be appreciated by one skilled in the art, aspects of the embodiments may be embodied as a system, apparatus, method, or a program product. Accordingly, embodiments may take the form of an all-hardware embodiment, an all-software embodiment (including firmware, resident software, micro-code, etc.), or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer-readable storage devices storing machine readable code, computer-readable code, and/or program code, collectively referred to hereafter as "code". The storage devices may be tangible, non-transitory, and/or non-transmission. The storage devices may not embody signals. In a certain embodiment, the storage devices only employ signals for accessing code.

Any combination of one or more computer-readable medium may be utilized. The computer-readable medium may be a computer-readable storage medium. The computer-readable storage medium may be a storage device storing the code. The storage device may be, for example, but is not limited to being, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, random-access memory ("RAM"), read-only memory ("ROM"), an erasable programmable read-only memory ("EPROM" or flash memory), a portable compact disc read-only memory ("CD-ROM"), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Reference throughout this specification to "one embodiment", "an embodiment", or similar language, means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but not limited to", unless expressly specified otherwise. An enumerated listing of items does not imply that any or all of the items are mutually exclusive, unless expressly specified otherwise. The terms "a", "an", and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions—executed via the processor of the computer or other programmable data-processing apparatus—create a means for implementing the functions/acts specified in the schematic flowchart diagrams and/or schematic block diagrams.

The code may also be stored in a storage device that can direct a computer, other programmable data-processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data-processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, from the illustrated Figures.

The description of elements in each figure may refer to elements of proceeding figures. Like numbers refer to like elements in all figures, including alternate embodiments of like elements.

Enhancements to the SL communication in feD2D should be studied to enable effective channel measurement in order to meet the requirements for QoS, reliability, complexity and power consumption, and furthermore, to enable D2D-aided wearables and MTC applications. Disclosed herein are methods, apparatus, and systems that provide a mechanism of SL SRS transmission on a SL. As described herein, the SRS is based on a SL SRS configuration which configures location information of the SRS in the time-frequency domain. The SL SRS configuration is obtained by the remote/relay UE through receiving the SL SRS configuration from a network equipment such as eNB, pre-configuring the SL SRS configuration in the remote/relay UE, determining the SL SRS configuration according to a resource pool for SL communication, or receiving the SL SRS configuration from the relay/remote unit. The transmission/receiving of SRS from the relay/remote UE can be either periodic or aperiodic in which the transmission/receiving of SL SRS usually follows indication information indicating the SRS transmission/receiving.

Additionally, the SRS may be a single SRS which may occupy a portion of a whole SL bandwidth (also referred as a subband), or a set of SRS which includes one or more subband SRS and/or one wideband SRS.

The SL SRS is used for SL channel measurement hereinafter, but it should be understood that the SL SRS can be used for other purposes, such as power control for relay/remote UEs, similar with UL SRS.

FIG. 1A is a schematic diagram illustrating a case of unidirectional relay in unicast D2D communication. Both a relay UE and a remote UE are within the coverage of eNB. eNB communicates with the remote UE on DL, transmitting signaling/data to the remote UE bypass the relay UE, such as the SL SRS configuration as discussed below. The remote UE communicates with the relay UE over SL, thereby the signaling/data from the remote UE is transmitted to eNB through the relay UE, such as RSRP, RSSI or CSI as the result of SL channel measurement. Additionally, the result of eNB-remote UE DL channel measurement may also be reported to the eNB from the remote UE through the relay UE.

Figure 1B:
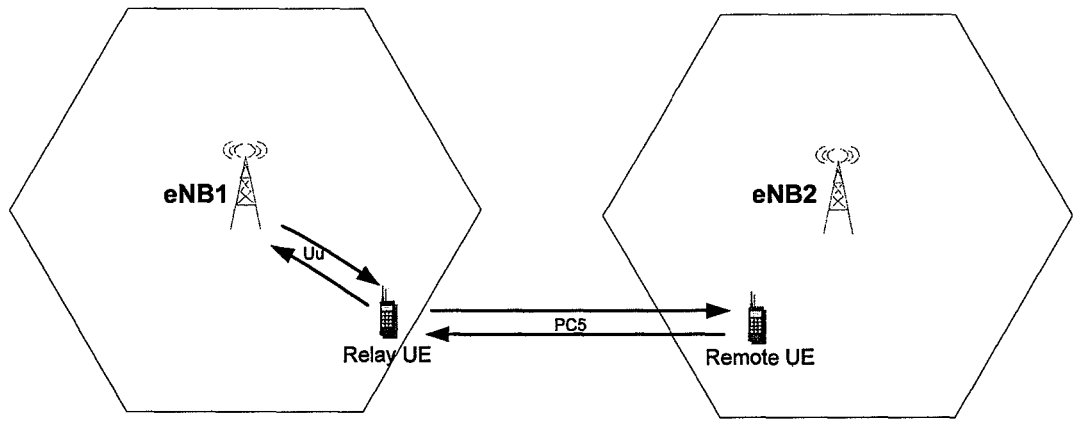

FIG. 1B is a schematic diagram illustrating a case of bidirectional relay in unicast D2D communication. Relay UE is in the coverage of eNB in FIG. 1B. eNB does not communicate with the remote UE in the bidirectional relay case, thereby the signaling/data to the remote UE is transmitted from eNB through the relay UE, such as SL SRS configuration as discussed below.

Figure 2:
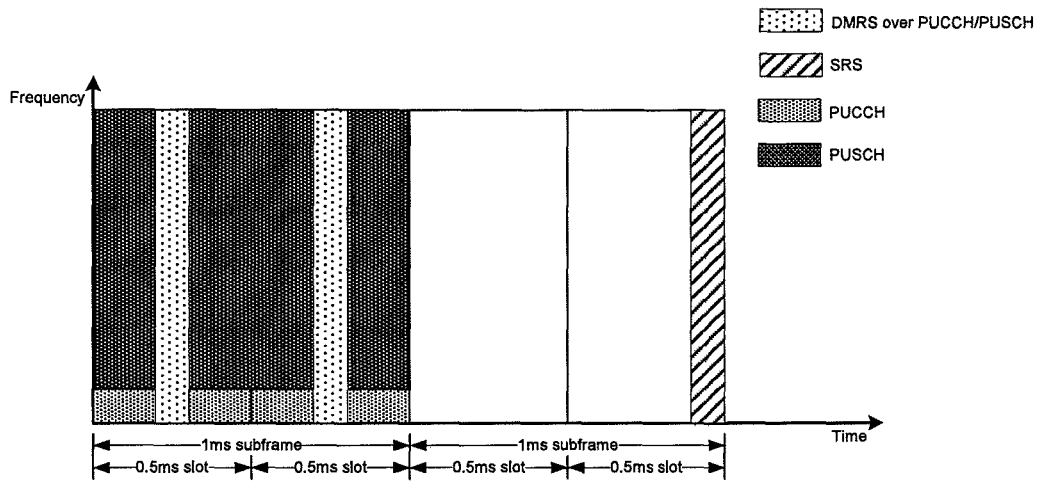
FIG. 2 is a schematic diagram illustrating SRS and DMRS in UL subframes for UL channel measurement.

As described herein, the SL channel measurement is performed by a relay/remote UE based on a SRS which is also referred to as SL SRS herein. Two types of reference signals are supported on uplink between an eNB and a UE, which are DMRS and SRS. FIG. 2 is a schematic diagram illustrating SRS and DMRS in UL subframes for UL channel measurement. As shown in FIG. 2, the DMRS is associated with transmissions of uplink data on PUSCH and/or signaling on the PUCCH, and is primarily used for channel estimation or coherent demodulation. Also, as shown in FIG. 2, the SRS, also referred to as UL SRS, is associated with uplink data and/or signaling transmissions, and usually occupies the last symbol of the last UL subframe and the whole UL bandwidth of the UE, thereby the result of UL channel measurement based on UL SRS, such as UL CSI, RSSP, RSSI, etc., can reflect a thorough UL channel quality so that frequency-selective scheduling on the uplink is enabled. Additionally, the UL SRS can be used for other purposes, such as power control or power-up procedures for UEs not yet scheduled. The eNB selects the UL resources for UL transmission based on the measurement result, e.g. CSI. In LTE-TDD, due to channel reciprocal, the UL SRS based measurement can be further used for estimation of DL CSI.

Similar with the concept and usage of UL SRS, the reason that the SL channel measurement is based on SL SRS as described herein is that the measurement result in such a way can present a thorough SL channel quality. On the contrary, the result of SL channel measurement based on a scheduled SL transmission (e.g., discovery, synchronization signal, SCI on PSCCH or data on PSSCH) or the DMRS within the SL transmission (e.g., DMRS occupies the resource of PSCCH/PSSCH) only reflects the channel quality over a portion of a whole SL bandwidth, i.e. the scheduled transmission may not occupy the whole SL bandwidth. Additionally, if the SL channel measurement is based on one or more of the scheduled transmissions such as discovery, synchronization signal, SCI on PSCCH or data on PSSCH, the timing of SL channel measurement cannot be guaranteed due to uncertainty of these scheduled transmissions. There is thus a need to support SL channel measurement based on SL SRS. Further, the SL SRS can be used for other purposes in addition to the SL channel measurement, similar with UL SRS.

There are two types of UL SRS: periodic SRS (trigger type 0) introduced in 3GPP Rel-8 and aperiodic SRS (trigger type 1) introduced in Rel-10. The eNB may either request an individual SRS transmission from a UE (trigger type 1), or configure a UE to transmit SRS periodically until terminated (trigger type 0). 1-bit UE-specific signaling parameter of 'duration' in SoundingRS-UL-Config information element (3GPP TS36.331) indicates whether the requested SRS transmission is a one-time transmission or a periodic transmission. The types of SL SRS transmission as described herein are similar with those of UL SRS transmission, and can be indicated in a SL SRS configuration as described herein, which is similar with the known SoundingRS-UL-Config information element.

FIGS. 3-8B describe periodic SL SRS transmission and aperiodic SL SRS transmission in both unidirectional relay scenario and bidirectional relay scenarios. It would be understood that the steps in FIGS. 4A-5B and FIGS. 7A-8B between the remote UE and relay UE can be exchanged with each other, e.g. as described below, the indication information for the SL SRS transmission can be transmitted from either the remote UE or the relay UE, and the SL SRS can also be transmitted from either the remote UE or relay UE, no matter whether it is the unidirectional relay scenario or the bidirectional relay scenario. The difference between the unidirectional relay scenario or bidirectional relay scenario is that the remote UE may receive the SL SRS configuration or trigger information for SL SRS transmission from the eNB in the unidirectional scenario, while the remote UE receives the above messages from the relay UE in the bidirectional scenario.

Figure 3:
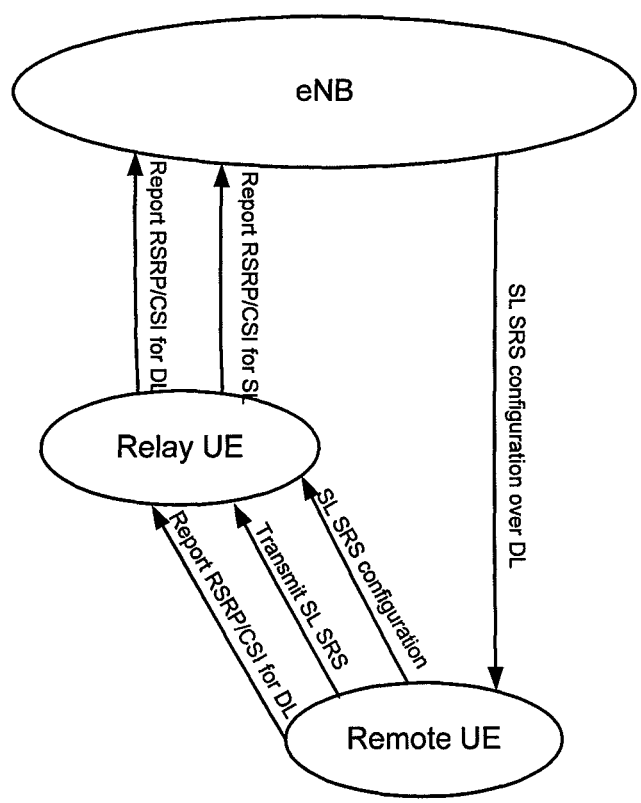
FIG. 3 is a schematic diagram illustrating SL channel measurement in the unidirectional relay case according to one embodiment.

FIG. 3 is a schematic diagram illustrating SL channel measurement in the unidirectional relay case according to one embodiment. As shown in FIG. 3, eNB transmits SL SRS configuration to a remote UE over DL, and then the remote UE forwards the SL SRS configuration to a relay UE. The remote UE transmits SL SRS for one time, which is referred to as aperiodic transmission, or periodically. The relay UE performs the SL channel measurement based on the received SL SRS and transmits the measurement result such as RSRP or CSI to the eNB. Additionally, as shown in FIG. 3, the remote UE may also performs DL channel measurement since the DL communication between the eNB and remote UE is allowed in the unidirectioal relay scenario, and transmits the corresponding measurement result to the relay UE which further forwards the result to the eNB.

As illustrated in FIG. 3, the SL SRS configuration is received by the remote UE from the eNB and then forwarded from the remote UE to the relay UE, however, the SL SRS configuration may be pre-configured in both the remote UE and the relay UE. The SL SRS configuration may be similar with the known SoundingRS-UL-Config information element as mentioned above, and indicate location information of the SRS in time-frequency domain, e.g. the time/frequency offset between SL SA/data and SL SRS, the time/frequency offset between two SL SRS, or whether the transmission of SL SRS is periodic or aperiodic, e.g. indication by a signaling parameter of 'duration'.

Figure 4A:
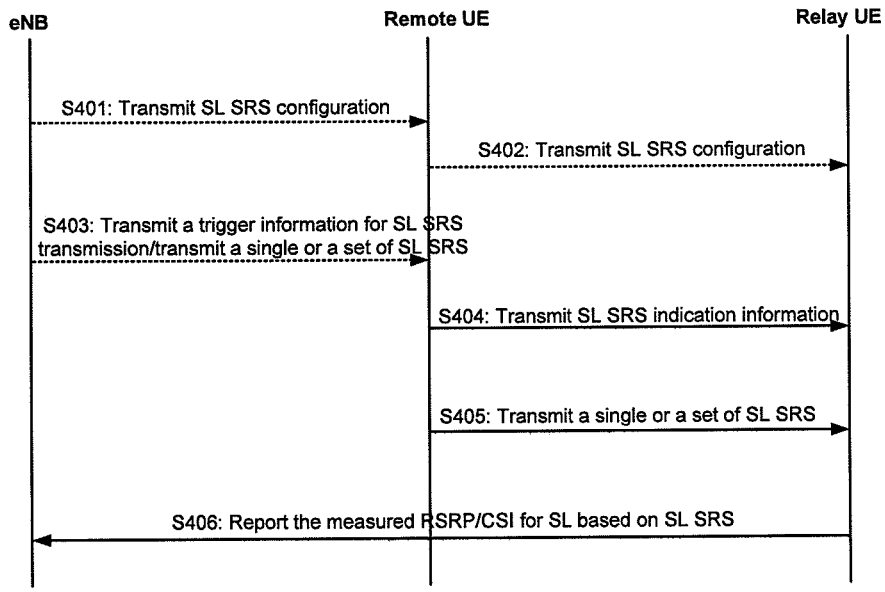
FIGS. 4A and 4B are call flows illustrating that a SL SRS is transmitted from a remote UE following indication information in the unidirectional case according to one embodiment.

FIG. 4A is a call flow illustrating that a remote UE aperiodically transmits a SL SRS to a relay UE following indication information from the remote UE in the unidirectional case according to one embodiment. As shown in FIG. 4A, the eNB transmits a SL SRS configuration to the remote UE on DL in step 401, such as by higher layer signaling (RRC signaling). The remote UE forwards the SL SRS configuration to the relay UE in step 402, such as by a higher layer signaling over PSSCH or by a discovery signaling over PSDCH. Step 401 and/or 402 are optional as illustrated with dash lines, e.g. the SL SRS configuration can be pre-configured in remote/relay UE, or the relay UE receives the SL SRS configuration from the eNB rather than the remote UE.

In step 403, the eNB transmits trigger information for SL SRS transmission to the remote UE. The trigger information may be in a downlink control signaling such as DCI over PDCCH, or in a higher layer signaling such as a discovery response to the remote UE in the procedure of relay UE discovery, or over a piggyback in a higher layer signaling. The trigger information may indicate location information of the SL SRS to be transmitted in the frequency-time domain, such as an time/frequency offset between SL SA/data and SL SRS to be transmitted.

Alternatively, the eNB may transmit a SL SRS to the remote UE in step 403, i.e. the eNB selects the SL SRS. The SL SRS selected by eNB may be a single SRS or a set of SRS, as described below.

In step 404, the remote UE transmits indication information to the relay UE according to the received trigger in step 403, wherein the indication information indicates the SRS transmission. The indication information may be in sidelink control signaling such as SCI over PSCCH, or in a higher layer signaling over PSSCH, or in a discovery signaling over PSDCH. Additionally, step 403 is optional as illustrated with dash lines, i.e. the remote UE determines the SL SRS transmission by itself. Alternatively, the indication information may be transmitted from the relay UE to the remote UE, which is described in step 413 in FIG. 4B.

In step 405, the remote UE transmits a SL SRS that includes a single SRS or a set of SRS to the relay UE according to the indication information.

Figure 9A:
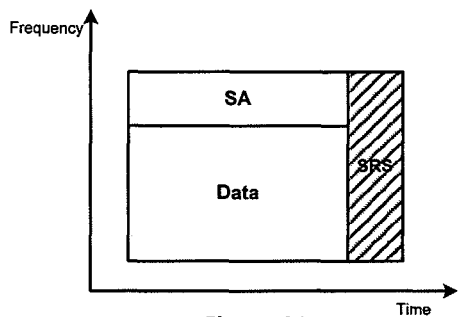
FIGS. 9A, 9B and 9C are schematic diagrams illustrating a single SL SRS according to one embodiment.
Figure 9B:
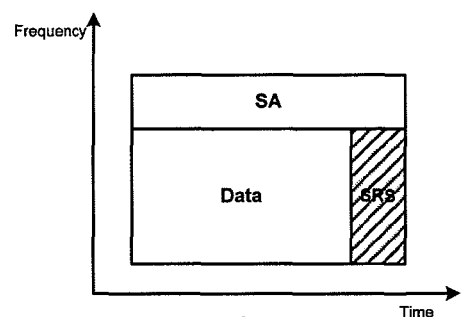
Figure 9C:
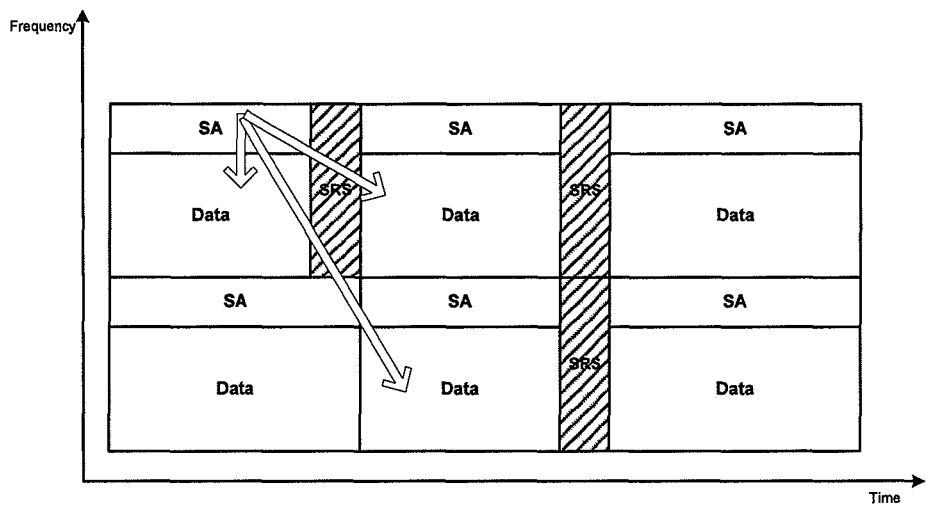

FIGS. 9A, 9B and 9C are schematic diagrams illustrating a single SRS according to one embodiment. As illustrated in FIGS. 9A and 9B respectively, the SL SRS may occupy the bandwidth of both SA and SL data, or may only occupy the bandwidth of SL data. Further, as illustrated in FIG. 9C, the indication information in SA can indicate the location of SL SRS to be transmitted in time-frequency domain, such as an offset between the SL SRS and the SL data, or indicate whether the SL SRS is transmitted or not, or indicate which SRS is transmitted.

Figure 10:
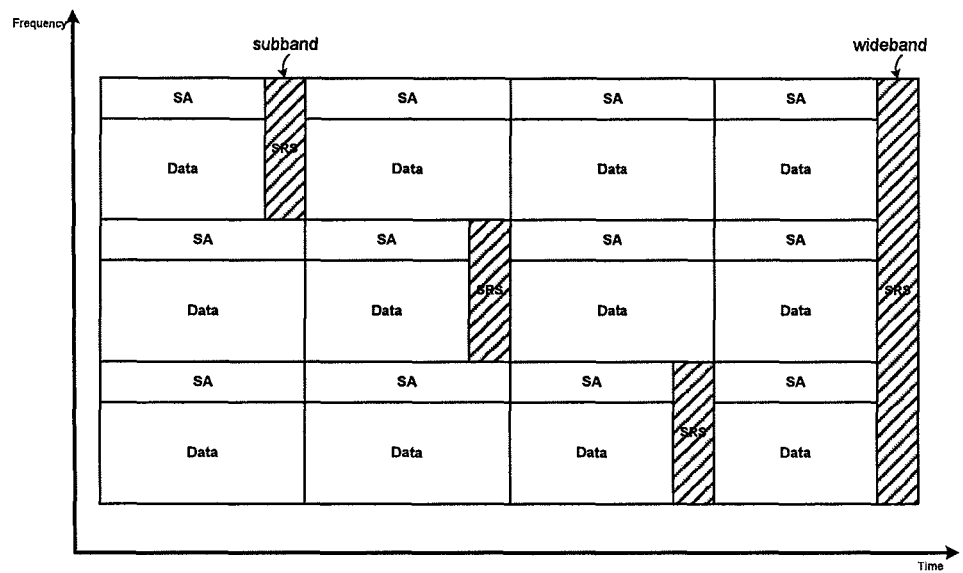
FIG. 10 is a schematic diagram illustrating a set of SL SRS according to one embodiment.

FIG. 10 is a schematic diagram illustrating a set of SRS according to one embodiment. The set of SL SRS can include one or more subband SL SRS and/or one wideband SL SRS so that the set of SL SRS may occupy the whole SL bandwidth. Additionally, the time/frequency offset between two SL SRS in each set may be configured by the eNB, such as in the SL SRS configuration from eNB. Similar with the bandwidth occupation of a single SL SRS, the set of SL SRS may occupy the bandwidth of both SA and SL data, or may only occupy the bandwidth of SL data. Additionally, the subband SRS in a set of SL SRS is associated with a configured resource pool for SL transmission/reception.

An example of the set of SL SRS is described below. The set of SL SRS can be determined by the configured bandwidth for SL transmission/reception and the number of SL SRS in each set. For example, the bandwidth of SL transmission/reception is 20 MHz and the number of SL SRS transmission is 5. There are thus 4 subband SL SRS with the bandwidth of 5 MHz for each subband SL SRS, and 1 wideband SL SRS with the bandwidth of 20 MHz. Additionally, the frequency/time resource of subband SL SRS can follow legacy hopping rules.

Three examples of the indication information for the SL SRS transmission are described below. As an example, one bit field included in the indication information can be used to indicate whether the SL SRS is transmitted or not. For example, The location information of SL SRS is configured in the SL SRS configuration, the value of '1' of the indication information indicates that the SL SRS configured in the SL SRS configuration is to be transmitted, while the value of '0' indicates not.

As another example, at least one bits field included in the indication information is used to indicate which of SL SRS are transmitted. For example, the combinations of 2 bits represent one of 4 single SL SRS or 4 pre-configured sets of SL SRS which are determined according to the SL SRS configuration.

As yet another example, at least one bits field included in the indication information is used to indicate which of SL SRS are transmitted in a bitmap manner, e.g. whether the SL SRS represented in the corresponding bit of the bitmap is transmitted or not. For example, 4 bits of '1101' represent that the SL SRS in subband #1, #2 and the wideband SL SRS are to be transmitted, wherein the location information of the SL SRS in the time-frequency domain can be determined according to the SL SRS configuration.

Returning to FIG. 4A, in step 406, the relay UE performs the SL channel measurement based on the received SL SRS, and then transmits the measurement result such as RSRP or CSI to the eNB. Future, the SL SRS can be used for other purposes in addition to the SL channel measurement, such as power control for relay/remote UEs.

Figure 4B:
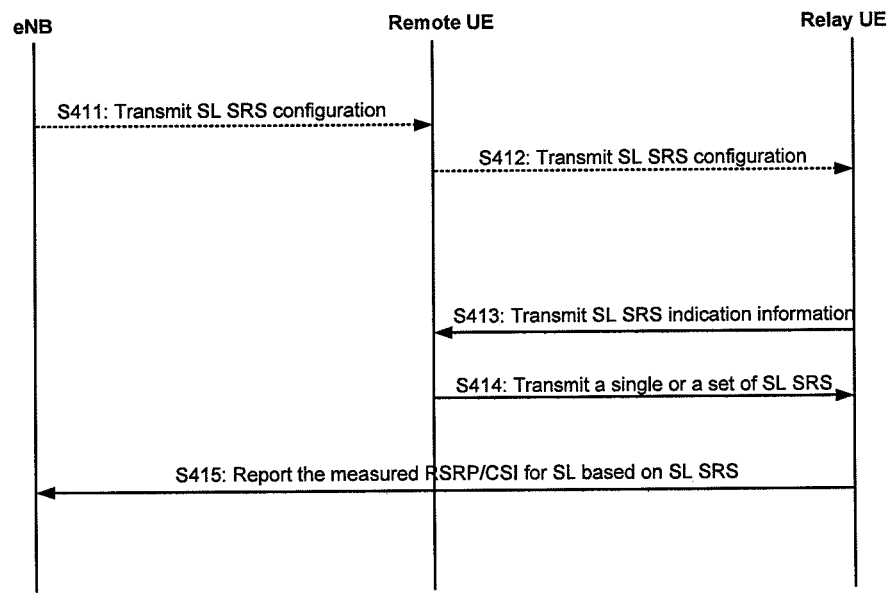

FIG. 4B is a call flow illustrating that a remote UE aperiodically transmits a SL SRS to a relay UE following indication information from the relay UE in the unidirectional case according to one embodiment. The call flow in the FIG. 4B is similar with that in the FIG. 4A, except that the indication information is transmitted from the relay UE to the remote UE, and thereby the descriptions of the steps are omitted.

Another embodiment is that both the indication information and SL SRS are transmitted from the relay UE, and the remote UE performs the corresponding actions in the response to the SL SRS receiving, e.g., performs the SL channel measurement and transmits the measurement result to the relay UE (not shown). The indication information or the SL SRS can be transmitted from either the remote UE or relay UE, and correspondingly, the party which receives the SL SRS can perform the SL channel measurement based on the received SL SRS. That is, the indication information can be transmitted from either the relay UE or remote UE and indicates which of the relay UE and remote UE is transmitting the SL SRS. It should be noted that the format of the indication from the remote UE and from the relay UE may be different.

Figure 5A:
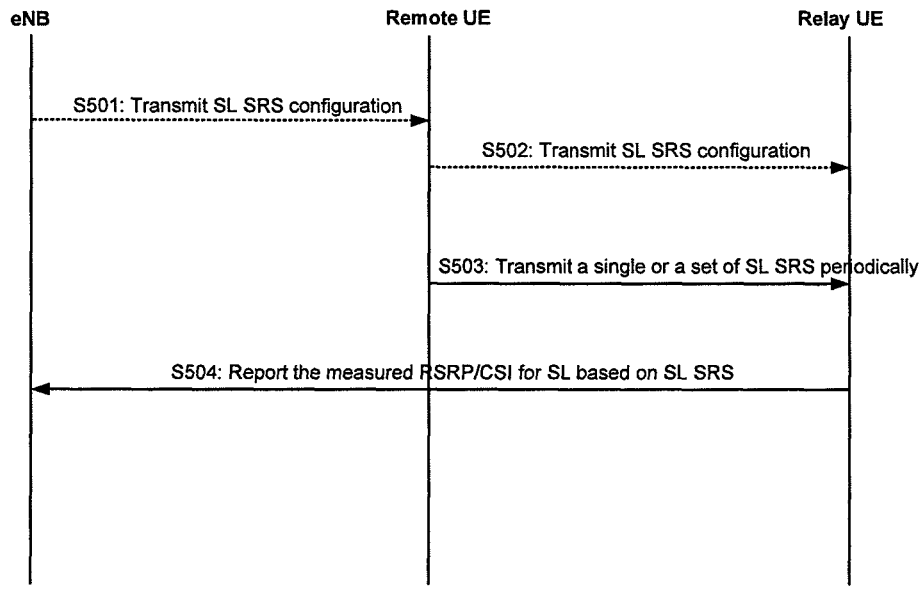
FIGS. 5A and 5B are call flows illustrating that a SL SRS is periodically transmitted from a remote/relay UE in the unidirectional case according to one embodiment.

FIG. 5A is a call flow illustrating that a remote UE periodically transmits a SL SRS to a relay UE in the unidirectional case according to one embodiment. As shown in FIG. 5A, steps 501 and 502 are similar to steps 401 and 402 in FIG. 4A, and thereby the descriptions of these two steps are omitted. Similar with the option of step 401 and/or 402, the step 501 and/or 502 are optional as illustrated by dash lines, e.g. the SL SRS configuration can be pre-configured in remote/relay UE.

In step 503, the remote UE periodically transmits a SL SRS including a single SRS or a set of SRS to the relay UE. The single SL SRS has already been described above with reference to FIGS. 9A-9C, while the set of SL SRS has already been described above with reference to FIG. 10. Additionally, the periodic transmission of SL SRS can be associated with SL SPS transmission/reception. For example, SL SRS may be on the last symbol of configured SPS transmission/reception subframes.

Additionally, the periodic SL SRS transmission in step 503 can be further triggered by the indication information from the relay/remote UE and/or further by the trigger information from eNB (not shown). Further, the periodic SL SRS transmission can be terminated by the indication information from the relay/remote UE and/or further by the trigger information from eNB (not shown). The examples of the indication information is described above, which is omitted for the purpose of conciseness.

In step 504, the relay UE performs the SL channel measurement based on the received SL SRS, and then transmits the measurement result such as RSRP or CSI to the eNB. Future, the SL SRS can be used for other purposes in addition to the SL channel measurement, such as power control for relay/remote UEs.

Figure 5B:
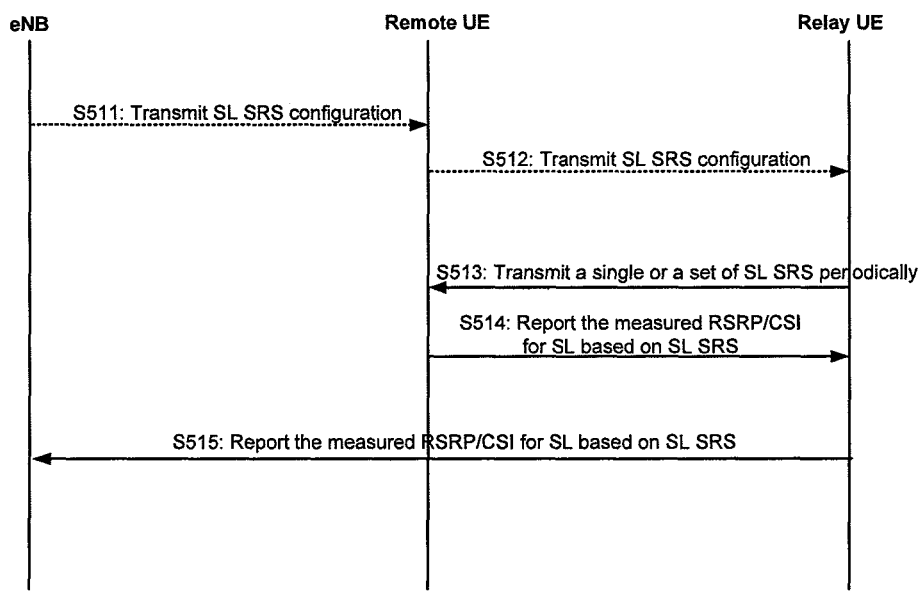

Alternatively, the SL SRS may be periodically transmitted from the relay UE to the remote UE, and correspondingly, the SL channel measurement can be performed by the remote UE, which is illustrated in steps 513 and 514 in FIG. 5B. Other steps in FIG. 5B are similar with that in FIG. 5A, thereby the corresponding descriptions are omitted for the purpose of conciseness.

That is, the SL SRS can be periodically transmitted from either the remote UE or relay UE, and correspondingly, the party which receives the SL SRS performs the corresponding actions in the response to the SL SRS receiving, e.g., performs the SL channel measurement based on the received SL SRS.

Figure 6:
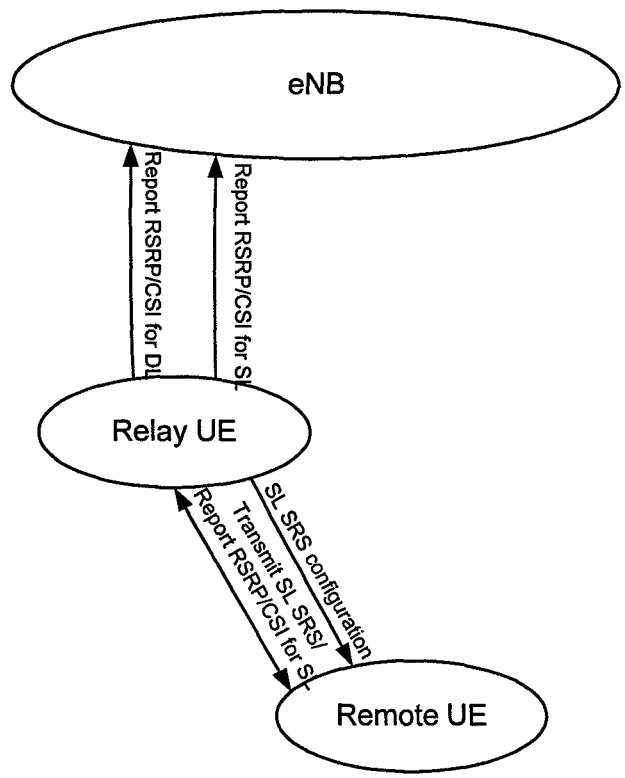
FIG. 6 is a schematic diagram illustrating SL channel measurement in the bidirectional relay case according to one embodiment.

FIG. 6 is a schematic diagram illustrating SL channel measurement in the bidirectional relay case according to one embodiment. As shown in FIG. 6, the eNB transmits SL SRS configuration to a relay UE over DL, and then the relay UE forwards the SL SRS configuration to the remote UE. The relay/remote UE transmits SL SRS for one time, which is referred to as aperiodic transmission, or periodically. The remote/relay UE performs the SL channel measurement based on the received SL SRS, and then the relay UE transmits the measurement result such as RSRP or CSI to the eNB. Additionally, as shown in FIG. 6, there is not a direction link between eNB and a remote UE. The remote UE thus does not perform the DL channel measurement, comparing with FIG. 3.

As illustrated in FIG. 6, the SL SRS configuration is received from the eNB to the relay UE and then forwarded from the relay UE to the remote UE. However, the SL SRS configuration may be pre-configured in both the remote UE and the relay UE, or the SL SRS configuration may be selected from a resource pool for SL transmission/reception by the relay UE. The definition of the SL SRS configuration is the same as in the above description, which is omitted for the purpose of the conciseness.

Figure 7A:
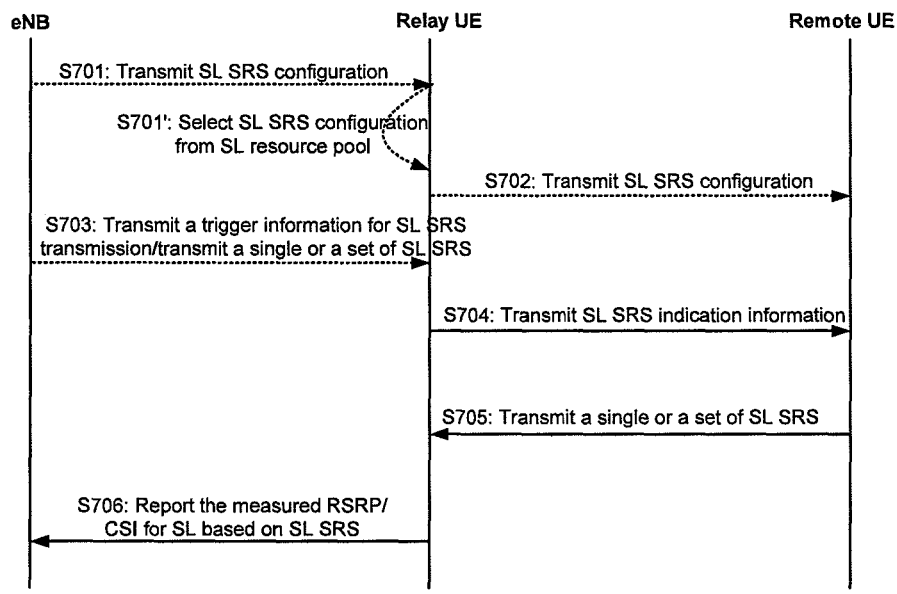
FIGS. 7A and 7B are call flows illustrating that a SL SRS is transmitted from a remote UE following an indication information in the bidirectional case according to one embodiment.

FIG. 7A is a call flow illustrating that a remote UE aperiodically transmits a SL SRS to a relay UE following indication information from the relay UE in the bidirectional case according to one embodiment. As shown in FIG. 7A, the eNB transmits a SL SRS configuration to the relay UE on DL in step 701, such as by higher layer signaling (RRC signaling). Alternatively, the relay UE selects the SL SRS configuration according to the resource pool for SL transmission/reception, as shown in step 701'. The relay UE forwards the SL SRS configuration to the remote UE in step 702, such as by a higher layer signaling over PSSCH or by a discovery signaling over PSDCH. Steps 701, 701' and/or 702 are optional as illustrated with dash lines, e.g. the SL SRS configuration can be pre-configured in remote/relay UE.

In step 703, the eNB transmits trigger information for SL SRS transmission to the relay UE. The trigger information may be in a downlink control signaling such as DCI over PDCCH, or in a higher layer signaling such as a discovery response to the relay UE in the procedure of relay UE discovery, or over a piggyback in a higher layer signaling. The trigger information may indicate location information of the SL SRS to be transmitted in the frequency-time domain, such as a time/frequency offset between SL SA/data and SL SRS to be transmitted.

Alternatively, the eNB may transmit a SL SRS to the relay UE in step 703, i.e. the eNB selects the SL SRS. The SL SRS selected by eNB may be a single SRS or a set of SRS, as described above.

In step 704, the relay UE transmits indication information to the remote UE according to the received trigger in step 703, wherein the indication information indicates the SRS transmission and indicates that the SL SRS is to be transmitted by the remote UE. The indication information may be in sidelink control signaling such as SCI over PSCCH, or in a higher layer signaling over PSSCH, or in a discovery signaling over PSDCH. Additionally, step 703 is optional as illustrated with dash lines, i.e. the relay UE determines the SL SRS transmission by itself. The examples of the indication information is described above, which is omitted for the purpose of conciseness.

In step 705, the remote UE transmits a SL SRS including a single SRS or a set of SRS, which are described above with reference to FIGS. 9A-9B and FIG. 10, to the relay UE according to the indication information.

In step 706, the relay UE performs the SL channel measurement based on the received SL SRS, and then transmits the measurement result such as RSRP or CSI to the eNB. Future, the SL SRS can be used for other purposes in addition to the SL channel measurement, such as power control for relay/remote UEs.

Figure 7B:
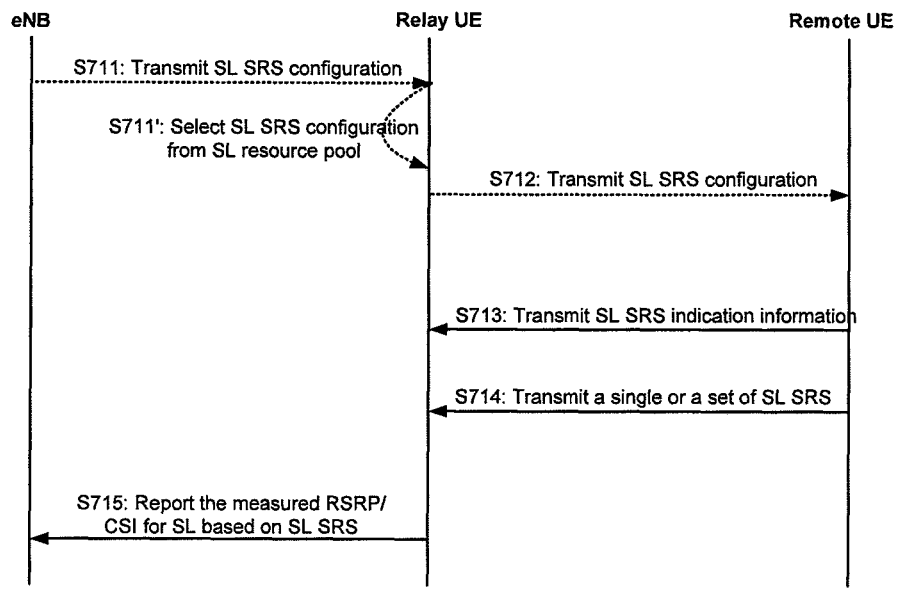

Alternatively, both the indication information and the SL SRS may be transmitted from the remote UE to the relay UE, and correspondingly, the SL channel measurement can be performed by the relay UE based on the received SL SRS, which is described in steps 713 and 714 in FIG. 7B. Other steps in FIG. 7B are similar with that in FIG. 7A, thereby the descriptions thereof are omitted for the purpose of conciseness.

Another embodiment is that both the indication information and SL SRS are transmitted from the relay UE, and the remote UE performs the corresponding actions in the response to the SL SRS receiving, e.g., performs the SL channel measurement and transmits the measurement result to the relay UE (not shown). That is, the indication information can be transmitted from either the relay UE or remote UE and indicates which of the relay UE or remote UE is transmitting the SL SRS. It should be noted that the format of the indication from the remote UE and from the relay UE may be different.

Figure 8A:
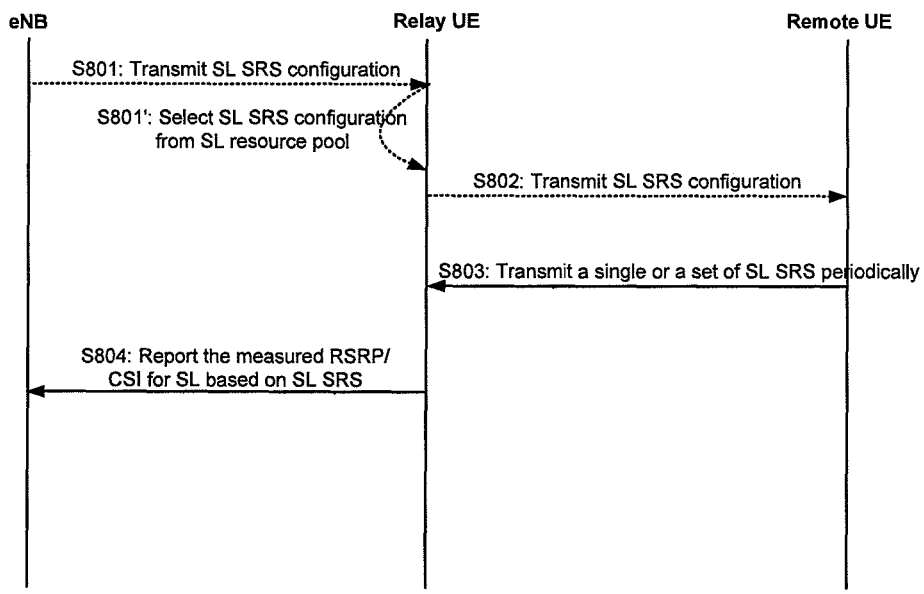
FIGS. 8A and 8B are call flows illustrating that a SL SRS is periodically transmitted from a remote/relay UE in the bidirectional case according to one embodiment.

FIG. 8A is a call flow illustrating that a remote UE periodically transmits a SL SRS to a relay UE in the bidirectional case according to one embodiment. As shown in FIG. 8A, steps 801/801' and 802 are similar with steps 701/701' and 402 in FIG. 7A, thereby the descriptions of these two steps are omitted. Similar with the option of steps 701 and/or 702, the step 801 and/or 802 are optional as illustrated in dash lines, e.g. the SL SRS configuration can be pre-configured in remote/relay UE.

In step 803, the remote UE periodically transmits a SL SRS including a single SRS or a set of SRS to the relay UE. The single SL SRS has already been described above with reference to FIGS. 9A-9C, while the set of SL SRS has already been described above with reference to FIG. 10. Additionally, the periodic transmission of SL SRS can be associated with SL SPS transmission/reception. For example, SL SRS may be on the last symbol of configured SPS transmission/reception subframes.

Additionally, the periodic SL SRS transmission in step 803 can be further triggered by the indication information from the relay/remote UE and/or further by the trigger information from eNB (not shown). Further, the periodic SL SRS transmission can be terminated by the indication information from the relay/remote UE and/or further by the trigger information from eNB (not shown). The examples of the indication information is described above, which is omitted for the purpose of conciseness. In step 804, the relay UE performs the SL channel measurement based on the received SL SRS, and then transmits the measurement result such as RSRP or CSI to the eNB. Future, the SL SRS can be used for other purposes in addition to the SL channel measurement, such as power control for relay/remote UEs.

Figure 8B:
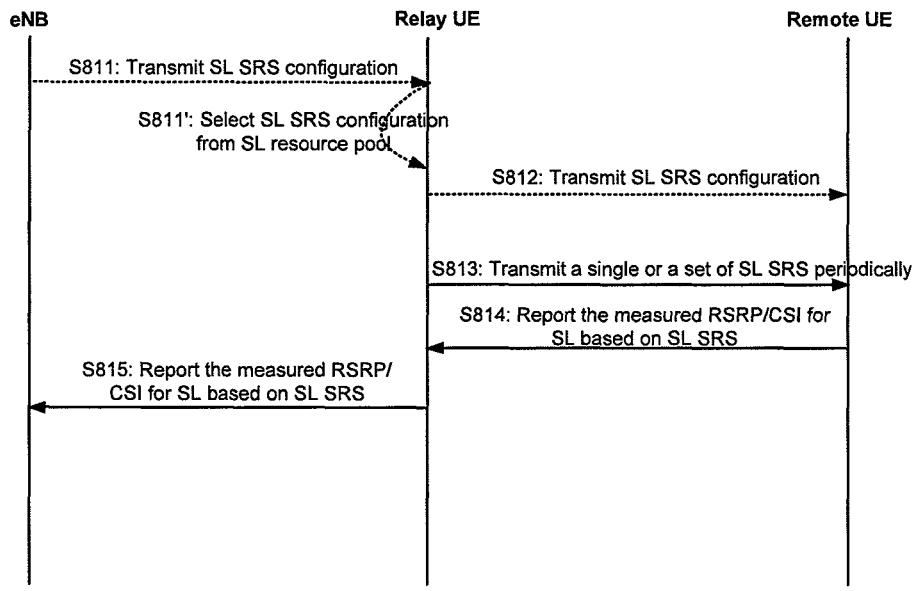

Alternatively, the SL SRS may be periodically transmitted from the relay UE to the remote UE, and correspondingly, the SL channel measurement is performed by the remote UE, which is illustrated in steps 813 and 814 in FIG. 8B. Other steps in FIG. 8B are similar with that in FIG. 8A, thereby the corresponding descriptions are omitted for the purpose of conciseness.

That is, the SL SRS can be periodically transmitted from either the remote UE or relay UE, and correspondingly, the party which receives the SL SRS performs the corresponding actions in the response to the SL SRS receiving, e.g., performs the SL channel measurement based on the received SL SRS.

Figure 11:
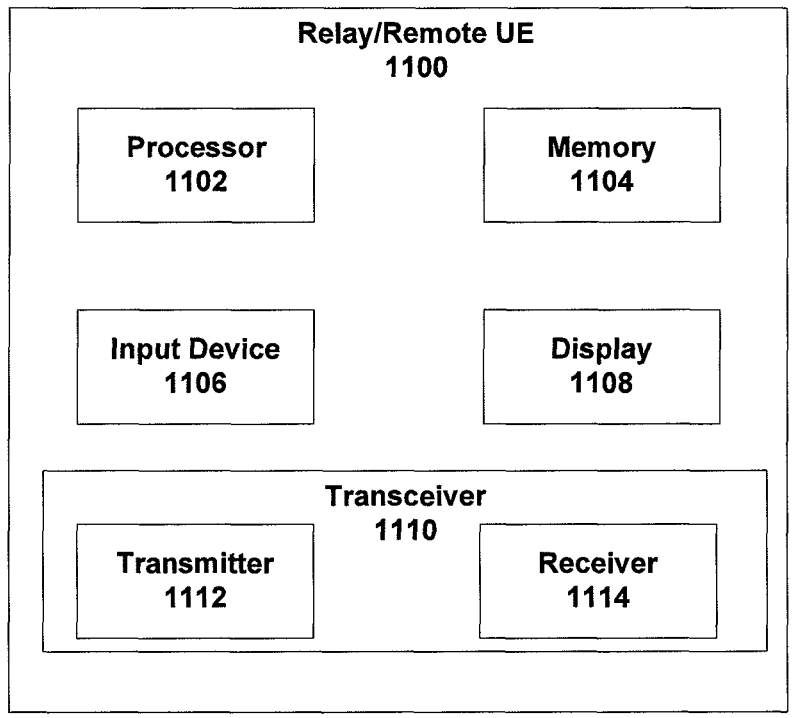
FIG. 11 is a schematic block diagram illustrating components of a relay/remote UE according to one embodiment.

FIG. 11 is a schematic block diagram illustrating components of a relay/remote UE according to one embodiment.

Relay/Remote UE 1100 is an embodiment of Relay/Remote UE described from FIG. 3 to FIG. 8B. Furthermore, Relay/Remote UE 1100 may include a processor 1102, a memory 1104, and a transceiver 1110. In some embodiments, Relay/Remote UE 1100 may include an input device 1106 and/or a display 1108. In certain embodiments, the input device 1106 and the display 1108 may be combined into a single device, such as a touch screen.

The processor 1102, in one embodiment, may include any known controller capable of executing computer-readable instructions and/or capable of performing logical operations. For example, the processor 1102 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1102 executes instructions stored in the memory 1104 to perform the methods and routines described herein. The processor 1102 is communicatively coupled to the memory 1104, the input device 1106, the display 1108, and the transceiver 1110.

In some embodiments, the processor 1102 controls the transceiver 1110 to transmit UL signals to Network Equipment 1200 and/or receive DL signals from Network Equipment 1200. For example, the processor 1102 may control the transceiver 1110 to transmit CSI/RSRP as a SL channel measurement result to a network equipment such as eNB in the case that UE 1100 is a relay UE. In another example, the processor 1102 may control the transceiver 1110 to receive a higher layer signaling such as RRC signaling including a SL SRS configuration, or a download control signaling such as a DCI format over PDCCH including trigger information for SL SRS transmission in the case that UE 1100 is a remote or relay UE, as described above. In certain embodiments, the processor 1102 may monitor DL signals received via the transceiver 1110 for specific messages. For example, the processor 1102 may monitor the trigger information for SL SRS transmission from a network equipment such as eNB.

The memory 1104, in one embodiment, is a computer-readable storage medium. In some embodiments, the memory 1104 includes volatile computer storage media. For example, the memory 1104 may include RAM, including dynamic RAM ("DRAM"), synchronous dynamic RAM ("SDRAM"), and/or static RAM ("SRAM"). In some embodiments, the memory 1104 includes non-volatile computer storage media. For example, the memory 1104 may include a hard disk drive, flash memory, or any other suitable non-volatile computer storage device. In some embodiments, the memory 1104 includes both volatile and non-volatile computer storage media. In some embodiments, the memory 1104 stores data relating to the SL SRS configuration received from the network equipment. In some embodiments, the memory 1104 also stores program code and related data, such as an operating system or other controller algorithms operating on Relay/Remote UE 1100.

Relay/Remote UE 1100 may optionally include an input device 1106. The input device 1106, in one embodiment, may include any known computer input device including a touch panel, a button, a keyboard, a stylus, a microphone, or the like. In some embodiments, the input device 1106 may be integrated with the display 1108, for example, as a touch screen or similar touch-sensitive display. In some embodiments, the input device 1106 includes a touch screen such that text may be inputted using a virtual keyboard displayed on the touch screen and/or by handwriting on the touch screen. In some embodiments, the input device 1106 includes two or more different devices, such as a keyboard and a touch panel. In certain embodiments, the input device 1106 may include one or more sensors for monitoring an environment of Relay/Remote UE 1100.

Relay/Remote UE 1100 may optionally include a display 1108. The display 1108, in one embodiment, may include any known electronically controllable display or display device. The display 1108 may be designed to output visual, audible, and/or haptic signals. In some embodiments, the display 1108 includes an electronic display capable of outputting visual data to a user. For example, the display 1108 may include, but is not limited to being, an LCD display, an LED display, an OLED display, a projector, or a similar display device capable of outputting images, text, or the like, to a user. As another non-limiting example, the display 1108 may include a wearable display such as a smart watch, smart glasses, a heads-up display, or the like. Further, the display 1108 may be a component of a smart phone, a personal digital assistant, a television, a table computer, a notebook (laptop) computer, a personal computer, a vehicle dashboard, or the like.

In certain embodiments, the display 1108 may include one or more speakers for producing sound. For example, the display 1108 may produce an audible alert or notification (e.g., a beep or chime). In some embodiments, the display 1108 includes one or more haptic devices for producing vibrations, motion, or other haptic feedback. In some embodiments, all or portions of the display 1108 may be integrated with the input device 1106. For example, the input device 1106 and display 1108 may form a touch screen or similar touch-sensitive display. In other embodiments, the display 1108 may be located near the input device 1106.

The transceiver 1110, in one embodiment, is configured to communicate wirelessly with the network equipment such eNB. In certain embodiments, the transceiver 1110 comprises a transmitter 1112 and a receiver 1114. The transmitter 1112 is used to transmit UL communication signals to the network equipment and the receiver 1114 is used to receive DL communication signals from the network equipment. For example, the transmitter 1112 may transmit CSI/RSRP as a SL channel measurement result to the network equipment. As another example, the receiver 1114 may receive a SL SRS configuration from the network equipment, or a single or set of SL SRS from the remote/relay UE as a peer party thereof. The SL SRS configuration received from the network equipment may be similar with the known SoundingRS-UL-Config information element as mentioned in 3GPP TS36.331, and indicates location information of the SRS in the time-frequency domain, e.g. the time/frequency offset between SL SA/data and SL SRS, the time/frequency offset between two SL SRS, or whether the transmission of SL SRS is periodic or aperiodic, e.g. indication by a signaling parameter of 'duration'. Based on the SL SRS configuration, the transceiver 1110 may transmit/receive the SRS for SL channel measurement with the remote/relay UE as a peer party thereof.

The transmitter 1112 and the receiver 1114 may be any suitable type of transmitter or receiver, respectively. Although only one transmitter 1112 and one receiver 1114 are illustrated, the transceiver 1110 may have any suitable number of transmitters 1112 and receivers 1114. For example, in some embodiments, Relay/Remote UE 1100 includes a plurality of transmitter 1112 and receiver 1114 pairs for communicating on a plurality of wireless networks and/or radio frequency bands, each transmitter 1112 and receiver 1114 pair configured to communicate on a different wireless network and/or radio frequency band than the other transmitter 1112 and receiver 1114 pairs.

Embodiments may be practiced in other specific forms. The described embodiments are to be considered in all respects only as illustrative and not as restrictive. The scope of the invention is, therefore, indicated by the appended claims rather than by the foregoing description. All changes which fall within the meaning and range of equivalency of the claims are to be embraced within their scope.

The invention claimed is:

1. An apparatus comprising a first user equipment, the apparatus further comprising:
   a transceiver that:
      receives a sidelink sounding reference signal configuration corresponding to a sounding reference signal (SRS) from a network equipment or a sidelink (SL) apparatus comprising a second user equipment;
      in response to receiving the sidelink sounding reference signal configuration from the network equipment:
         transmits the same sidelink sounding reference signal configuration received from the network equipment to the sidelink apparatus for the sidelink apparatus to be configured with the sidelink sounding reference signal configuration prior to receiving the sounding reference signal; and
         transmits the sounding reference signal to the sidelink apparatus; and
      in response to receiving the sidelink sounding reference signal configuration from the sidelink apparatus, transmits the sounding reference signal to the sidelink apparatus without transmitting the sidelink sounding reference signal configuration because the sidelink apparatus already is aware of the sidelink sounding reference signal configuration.

2. The apparatus according to claim 1, wherein, the SRS is based on a SL SRS configuration which configures location information of the SRS in time-frequency domain.

3. The apparatus according to claim 2, wherein the SL SRS configuration is obtained by one or more of the following: receiving the SL SRS configuration from a network equipment, pre-configuring the SL SRS configuration in the apparatus, determining the SL SRS configuration according to a resource pool for SL communication, and/or receiving the SL SRS configuration from another apparatus.

4. The apparatus according to claim 1,
   wherein the transceiver:
      periodically transmits the SRS on the SL.

5. The apparatus according to claim 1,
wherein the transceiver:
transmits indication information or receives the indication information corresponding to transmitting the SRS.

6. The apparatus according to claim 5,
wherein the transceiver:
receives trigger information from the network equipment, wherein the trigger information is carried on one or more of a physical downlink control channel and/or a higher layer signaling; and
transmits the indication information according to the trigger information.

7. The apparatus according to claim 1, wherein the SRS is a single SRS or a set of SRS.

8. The apparatus according to claim 7, wherein the set of SRS includes one or more subband SRS and/or one wideband SRS.

9. The apparatus according to claim 5, wherein the indication information is carried on one or more of a physical sidelink control channel, a higher layer signaling and/or a physical sidelink discovery channel.

10. The apparatus according to claim 7, wherein the indication information includes one bit field to indicate whether the SRS is transmitted or not.

11. The apparatus according to claim 7, wherein the indication information includes at least one bits field to indicate which of SRS are transmitted.

12. The apparatus according to claim 7, wherein the indication information includes at least one bits field to indicate which of SRS are transmitted in a bitmap manner.

13. An apparatus comprising a first user equipment, the apparatus further comprising:
a transceiver that:
receives a sidelink sounding reference signal configuration corresponding to a sounding reference signal (SRS) from a network equipment or a sidelink (SL) apparatus comprising a second user equipment;
in response to receiving the sidelink sounding reference signal configuration from the network equipment:
transmits the same sidelink sounding reference signal configuration received from the network equipment to the sidelink apparatus for the sidelink apparatus to be configured with the sidelink sounding reference signal configuration prior to receiving the sounding reference signal; and
receives the sounding reference signal from the sidelink apparatus; and
in response to receiving the sidelink sounding reference signal configuration from the sidelink apparatus, receives the sounding reference signal from the sidelink apparatus without transmitting the sidelink sounding reference signal configuration because the sidelink apparatus already is aware of the sidelink sounding reference signal configuration.

14. The apparatus according to claim 13, wherein, the SRS is based on a SL SRS configuration which configures location information of the SRS in time-frequency domain.

15. The apparatus according to claim 14, wherein the SL SRS configuration is obtained by one or more of the following: receiving the SL SRS configuration from a network equipment, pre-configuring the SL SRS configuration in the apparatus, determining the SL SRS configuration according to a resource pool for SL communication, and/or receiving the SL SRS configuration from another apparatus.

16. The apparatus according to claim 13,
wherein the transceiver:
periodically receives the SRS on the SL.

17. The apparatus according to claim 13,
wherein the transceiver:
transmits indication information or receives the indication information corresponding to receiving the SRS.

18. The apparatus according to claim 17,
wherein the transceiver that:
receives trigger information from the network equipment, wherein the trigger information is carried on one or more of a physical downlink control channel and/or a higher layer signaling; and
transmits the indication information according to the trigger information.

19. The apparatus according to claim 13, wherein the SRS is a single SRS or a set of SRS.

20. The apparatus according to claim 19, wherein the set of SRS includes one or more subband SRS and/or one wideband SRS.

21. The apparatus according to claim 17, wherein the indication information is carried on one or more of a physical sidelink control channel, a higher layer signaling and/or a physical sidelink discovery channel.

22. The apparatus according to claim 20, wherein the indication information includes one bit field to indicate whether the SRS is transmitted or not.

23. The apparatus according to claim 20, wherein the indication information includes at least one bits field to indicate which of SRS are transmitted.

24. The apparatus according to claim 20, wherein the indication information includes at least one bits field to indicate which of SRS are transmitted in a bitmap manner.

25. A method of a first user equipment, the method comprising:
receiving a sidelink sounding reference signal configuration corresponding to a sounding reference signal (SRS) from a network equipment or a sidelink (SL) apparatus comprising a second user equipment;
in response to receiving the sidelink sounding reference signal configuration from the network equipment:
transmitting the same sidelink sounding reference signal configuration received from the network equipment to the sidelink apparatus for the sidelink apparatus to be configured with the sidelink sounding reference signal configuration prior to receiving the sounding reference signal; and
transmitting the sounding reference signal to the sidelink apparatus; and
in response to receiving the sidelink sounding reference signal configuration from the sidelink apparatus, transmitting the sounding reference signal to the sidelink apparatus without transmitting the sidelink sounding reference signal configuration because the sidelink apparatus already is aware of the sidelink sounding reference signal configuration.

26. A method of a first user equipment, the method comprising:
receiving a sidelink sounding reference signal configuration corresponding to a sounding reference signal (SRS) from a network equipment or a sidelink (SL) apparatus comprising a second user equipment;
in response to receiving the sidelink sounding reference signal configuration from the network equipment:
transmitting the same sidelink sounding reference signal configuration received from the network equipment to the sidelink apparatus for the sidelink apparatus to be configured with the sidelink sounding reference signal configuration prior to receiving the sounding reference signal; and receiving the sounding reference signal from the sidelink apparatus; and in response to receiving the sidelink sounding reference signal configuration from the sidelink apparatus, receiving the sounding reference signal from the sidelink apparatus without transmitting the sidelink sounding reference signal configuration because the sidelink apparatus already is aware of the sidelink sounding reference signal configuration.

* * * * *